United States Patent
Pretorius et al.

(10) Patent No.: US 12,464,353 B2
(45) Date of Patent: Nov. 4, 2025

(54) METHOD FOR AUTHENTICATING AND/OR VALIDATING THE IDENTITY OF AN OBJECT

(71) Applicant: TÖNNJES ISI PATENT HOLDING GMBH, Delmenhorst (DE)

(72) Inventors: Albertus Jacobus Pretorius, Karalee (AU); Dennis Brandwein, Bremen (DE)

(73) Assignee: TÖNNJES ISI PATENT HOLDING GMBH, Delmenhorst (DE)

( * ) Notice: Subject to any disclaimer, the term of this patent is extended or adjusted under 35 U.S.C. 154(b) by 173 days.

(21) Appl. No.: 18/291,006

(22) PCT Filed: Jul. 12, 2022

(86) PCT No.: PCT/EP2022/069445
§ 371 (c)(1),
(2) Date: Mar. 19, 2024

(87) PCT Pub. No.: WO2023/001632
PCT Pub. Date: Jan. 26, 2023

(65) Prior Publication Data
US 2024/0251240 A1 Jul. 25, 2024

(30) Foreign Application Priority Data
Jul. 22, 2021 (DE) .................... 10 2021 118 971.3

(51) Int. Cl.
*H04L 9/08* (2006.01)
*G06K 7/10* (2006.01)
*H04W 12/06* (2021.01)

(52) U.S. Cl.
CPC ........ *H04W 12/06* (2013.01); *G06K 7/10366* (2013.01)

(58) Field of Classification Search
CPC .......................... H04W 12/06; G06K 7/10366
See application file for complete search history.

(56) References Cited

U.S. PATENT DOCUMENTS

| | | | |
|---|---|---|---|
| 6,397,334 B1 | 5/2002 | Chainer et al. | |
| 2005/0017844 A1 | 1/2005 | Cole | |
| 2012/0234908 A1 | 9/2012 | Wang et al. | |
| 2016/0295409 A1* | 10/2016 | Lee | H04W 12/04 |
| 2020/0293730 A1* | 9/2020 | Bhunia | G07D 7/181 |
| 2021/0012073 A1* | 1/2021 | Suko | G06K 19/0723 |

FOREIGN PATENT DOCUMENTS

DE       199 60 769 A1    6/2000

OTHER PUBLICATIONS

Oct. 24, 2022 International Search Report issued in International Patent Application No. PCT/EP2022/069445.
Jan. 18, 2024 International Preliminary Report on Patentability issued in International Patent Application No. PCT/EP2022/069445.

* cited by examiner

*Primary Examiner* — Normin Abedin
(74) *Attorney, Agent, or Firm* — Oliff PLC

(57) ABSTRACT

A method for authenticating and/or validating an identity of an object and information about the object, wherein the identity and the information relating to the object are stored in at least two, preferably three, four or more, data memories of a respective tag and these data memories are read out contactlessly by a reading device. The tags can be read out in arbitrary permutations on the object. Data sets with a plurality of data elements are stored in the data memories in a specified order, wherein the data elements comprise the identity or information relating to the object, the tag and/or a multiplicity of directly accessible authentication codes. Each data element is assigned to a permutation of the tags, thus providing a single directly accessible authentication code for authentication and/or validation.

10 Claims, No Drawings

METHOD FOR AUTHENTICATING AND/OR VALIDATING THE IDENTITY OF AN OBJECT

The invention relates to a method for authenticating and/or validating an identity of an object according to claim 1.

Methods of the kind described here essentially involve clarifying two questions when checking tags of objects, which may be, for example, parcels, items of luggage, vehicles or the like, specifically firstly the tag or a license plate is authentic and verifiable and secondly the tag or the license plate is assigned to the correct object.

The method claimed here is described using the example of a tag or registration plate for a vehicle. However, it should be expressly pointed out that the core idea of the invention should not be limited to this use, but rather can also be used to identify other objects, such as parcels, items of luggage and the like.

A license plate of the known type is an official document and shows the tag assigned, for example, to a vehicle during registration in road traffic. In addition to the tag itself, other data such as the vehicle identification number (VIN) and the vehicle brand and type are stored in the vehicle register as part of the registration process. Thus, the license plate can be clearly assigned to a vehicle and also to a vehicle owner and can thus be understood as a public identity card of the vehicle. Similar to an identity card, a license plate may contain one or more security features in order to make counterfeiting more difficult.

In order to be able to identify a vehicle at any time, license plates must typically be permanently fitted to the front or rear of a vehicle. The visibility and legibility of the license plates must be ensured at all times. However, established methods for fastening tags offer only a low level of theft protection. Directly fitting a license plate to the vehicle body with screws or the use of a conventional license plate holder does not prevent license plates from being able to be removed quickly and with little effort from one vehicle and being able to be improperly fastened to another.

Misuse with stolen license plates cannot be detected automatically. It must be deliberately checked whether or not license plates actually belong to a vehicle, for example in the course of routine investigations or specific suspected cases. If the vehicle registration document is not available, this requires a manual check of the tag and the associated data in the vehicle register. A query is made either directly via a secure Internet connection or verbally via cellphone or mobile radio devices. Errors in the input of data or insufficient network coverage can result in delays during checking in manual methods.

For known tags, manual visual inspection is possible by using self-adhesive security labels. These are fitted on the inside of the vehicle's windshield and repeat the tag assigned to the vehicle. An example that can be mentioned is the environmental sticker that was introduced in Germany and indicates the pollutant group of the vehicle on the one hand and the tag assigned to the vehicle on the other.

Since a security label is located inside the vehicle, it is protected to some extent from unauthorized access compared to the license plates. In addition, theft can be prevented by a special design of the security label, which prevents non-destructive removal of the security label from the windshield. Additional protection can be achieved by using security elements that hinder counterfeiting, such as a hologram. As an example, it is possible to cite here the holographic security label which is issued with the license plates and vehicle documents within the framework of registration.

Self-adhesive security labels also exist as an electronic version in the form of a printable smart label with an embedded radio frequency identification (RFID) transponder. These solutions are often used for electronic toll collection, access control to private areas or charging for public parking spaces. Typically, such RFID security labels are not personalized for every vehicle, but are centrally pre-produced. Only a unique identification number is stored, which enables a toll or parking manager to assign the vehicle and the vehicle owner via his own database. In addition to an RFID reader (incl. antenna), automatic license plate recognition using cameras comes into effect as a control mechanism.

Optical character recognition has always been used to prosecute regulatory offenses in road traffic, for example in the event of failure to observe a red stop signal or a speed violation. The characters on the tag are digitized and compared with the vehicle register using a vehicle photograph that has been created. Whether the license plate has been stolen and misused can only be determined after manual comparison of the photograph and vehicle data such as brand, model and color. Likewise, it is not automatically detected whether this is possibly a counterfeit tag.

However, electronic toll collection systems and parking management systems are increasingly also based on camera-based character recognition. Since there is no control whatsoever here as to whether an identification is fitted to the right vehicle, this method is also combined with self-adhesive RFID security labels.

While the (partially) automatic methods allow vehicle or tag identification in flowing road traffic, manual checks can usually only be carried out when vehicles are parked. Some methods basically do not allow an in-situ check, or at least do not allow an autonomous in-situ check, to be carried out in order to determine whether the license plate actually belongs to the vehicle to which it is fitted at the time of the check. In addition, usually only authorized persons have control options at all, since either sensitive data are queried in the vehicle register or access to private-sector databases is required. The situation is different only with the visual inspection of the self-adhesive security labels (with or without RFID functionality), since the tag assigned to the vehicle during registration can be read both on the license plate and on the security label.

Likewise, most methods lack a check of the authenticity of the license plate. Depending on the RFID chip used and the associated protection mechanisms, a self-adhesive RFID security label can also be manipulated under certain circumstances—or rather its identity can be stolen. It may be possible to read out the chip data and thus clone the RFID security label. Chip data can also be demolished if required.

Another disadvantage of the known reading methods of RFID transponders is that only one or a few license plates or data can be read out per unit of time. This is particularly difficult when checking vehicles moving on a road. It is not possible to capture all tags, in particular at higher vehicle speeds and in the case of multi-lane roads. However, capturing and checking all tags is essential for authenticating and/or validating the identities of the objects or the tag, and the information about that object.

On the basis of this, the invention is based on the object of providing a method which can be used to check the authenticity and/or validity of an identity of an object and of information about the object with a high degree of reliability and with increased security.

A method to achieve this object is described by the measures of claim 1. Accordingly, a method for authenticating and/or validating an identity of an object, in particular a parcel, an item of luggage, a vehicle or the like, is provided. The method also includes authenticating and/or validating information about the object. In this case, the identity and the information relating to the object are stored in at least two, preferably three, four or more, data memories, wherein a data memory is respectively assigned to a tag of the object. Accordingly, each object or the vehicle has at least two, preferably three, four or more, tags each with a data memory. These data memories are each read out contactlessly by a reading device which can be stationary or mobile. The at least two tags are located at any positions on the object or on the vehicle and are read out in any order/permutation. Data sets with a plurality of data elements are stored in the data memories in a specified order. The data elements comprise the identity and/or information relating to the object of the tag and/or a multiplicity of directly accessible authentication codes which can be used to authenticate the object. An essential measure of the invention is that each data element of the data memory is assigned to a permutation of the at least two tags. This provides a single directly accessible authentication code for authenticating and/or validating the identity of the object and the information. The use of at least two data memories, each of which is assigned to a tag of an object, and the specified data structure in the data memory make it possible to reliably and securely authenticate or validate the identities and the information. The method can be carried out in a simple and network-independent manner, in particular by reading out the data elements in any order and by virtue of the simultaneous authentication and/or validation by comparing the data in the different data memories.

The reading device or reading unit or the scanner may be designed as a handheld device or as a permanently installed unit on a bridge or a comparable object. The read-out is carried out by an optical sensor and/or electromagnetic transceiver and is essentially dependent on the data memory that was used and is to be read out or the combination of different data memories.

In particular, the invention provides for a data element of a data structure in the data memory to be identical for all data memories arranged on tags of the same object, in order to provide data sets from associated data memories on the object for reading, wherein a data element from the first data memory that has been read out is designated or used as a selector value for the associated data memories of the other tags on the object. As soon as the reading device has thus acquired a selector value of a data memory, the device can specifically search for the other data memories or tags assigned to the same object. If, for example, three tags each with a data memory are arranged on a vehicle, and the reading device has acquired a selector value from a first data memory, the reading device knows that further data memories are arranged on this vehicle and are to be detected. The information about the number and positions of the further data memories of the same object can also be stored in the first data memory. This targeted capture or read-out of a specific set of tags or data memories by the reading device leads to a particularly efficient method, since all other data memories, which are also located in the effective range or reading space of the reading device, are ignored.

It is preferably provided that, after the first data memory has been read out, the data memories associated with the first data memory only transmit data to the reading device which are stored at a memory address which is greater than the memory address of the data element read out first or the selector value. Since the reading device already knows all the data from the data element that has already been read out, and these data are identical for all data memories, these data are not read out again by the device. Accordingly, as soon as the reading device has acquired the selector value from the first data memory, and searches for the further data memories, the data elements or selector values from the remaining data memories are deactivated for read-out by the reading device. This not only allows the reading capacity of the reading device to be used very efficiently, but also allows the entire read-out process itself to be shortened, making the entire method more efficient.

Preferably, a particularly advantageous exemplary embodiment of the invention provides for the permutation of a reading sequence of the data memories of the plurality of tags to be mapped by the reading device to a directly accessible authentication code, when the code is stored in the last read data memory of the object. As soon as all data memories of an object have been read out, the arbitrary read-out order/permutation of the authentication codes is compared with the possible permutations stored in the data memory. If this permutation can be mapped to the stored values, the authentication and/or validation was successful. If the detected permutation or order of the data memories cannot be mapped to the stored data, no authentication and/or validation takes place.

Furthermore, the invention can provide that, after the data memory has been read out by the reading device, this tag is muted so that the data memory of this tag is not read out again in the further method and no further signals are generated. This muting of the data memory of a tag makes it possible to use all capacities of the reading device to find and read out the remaining tag or the data memories of the object that have not yet been read out. This makes it possible to further increase the efficiency of the method. It is also possible to reduce the time required to read out all data memories of an object.

An exemplary embodiment of the invention may provide for each data memory to be divided into three sections, namely a first section, a second section and a third section. The following data elements can be stored in the first section: CRC, PC, identity of the tag issuer, a registration number, the object identifier, in particular the vehicle identifier, information about the position of the tag on the object, information about and number of further tags on the same object, and a selector value.

The following data can be stored in the second section: A unique identification of the data memory, in particular of a transponder (TID), that can no longer be subsequently changed.

The following data elements can be stored in the third section of the data memory: User information, such as signatures of individual data memories, authentication codes, and possible permutations of all tags.

In addition to the data elements mentioned here, further information can also be stored in the data memory. Similarly, a different division of the data memories is conceivable.

In order to authenticate and/or validate the object, the method according to the invention can provide the following steps: The reading device first reads out the first, then the second and then the third section of the first data memory. The first data memory is the data memory that is first detected by the reading device. It is conceivable that this data memory is read out as the second or third etc. data memory in a further read-out method according to the invention. After reading out the first tag with the first data memory, this data memory is muted for the further method. As a result, this data memory cannot be read out again during this authentication or validation. Nor can this data memory emit any further signal. This can prevent this data memory from being read out again, which would make the entire method very inefficient. The position of the tag on the object, the number and position of further tags on the same object and the selector value are then extracted from the first section of the first data memory. This extraction can be carried out by a control device or a processor device which is connected to the reading device. On the basis of the extracted selector value from the first data memory that has been read out, the reading device searches for a second tag with a second data memory. The second tag or the second data memory is the data memory that is found second. Only some of the data from the first section are read out from this data memory. The second tag in turn emits a signal indicating that it has been detected to the reading device. A part of the first section and the second and third sections of the second data memory are read out by the reading unit. All information about the object or vehicle is now available to the control device. Whether this identity or information is authentic or valid can be tested by means of the further step. The second tag with the second data memory is now also muted for the further method, so that the data memory is not read out again and also cannot emit a signal. If further tags are arranged on the object, at least some of the aforementioned steps can be repeated. Finally, the read-out authentication codes of all data memories of the object are compared with the permutations stored in the data memory last read out. This comparison of the authentication codes with the permutations makes it possible to securely and reliably authenticate and/or verify the identity and the information about the object. If the authenticity can be confirmed, the stored data or the identity and the information about the object are authentic, i.e. not tampered with or stolen.

If the data comparison of the at least two tags of the object has led to the authentication and/or validation of the object, a corresponding positive authentication/validation signal can be generated. If the comparison of the data has revealed that the tags cannot be assigned to the same object, a negative authentication/validation signal is generated. These signals can be, for example, an optical, acoustic or haptic signal. Alternatively, the control device stores a written entry for documentation in a stored data set and, if necessary, initiates further processing or evaluation of the data elements.

The invention may provide for the identity or information about the object to be authenticated/validated during a movement of the object relative to the reading unit. It does not matter at what speed the object or the vehicle moves and how large the object density is in the effective range of the reading device. As soon as the reading device has determined a selector, only corresponding data are searched for or the data memories of the object report back which have received a corresponding activation signal from the reading device.

Provision may be made for data memories with RAIN® RFID technology to be used for the method. In particular, passive UHF RFID tags/chips in accordance with ISO/IEC 18000-63 are used. Similarly, RF RFID tags/chips in accordance with ISO/IEC 15693 or ISO/IEC 18000-3 and NFC tags/chips in accordance with ISO/IEC 14443A/B or ISO/IEC 18092 can also be used alternatively or additionally. Information technologies in accordance with ISO/IEC 20248 (specification of a data structure), ISO/IEC 18004 (QR barcode) and ISO/IEC 16022 (data matrix barcode) are also used in this context.

RAIN® RFID technology is preferable over other technologies, as this results in a variable number of tags being able to be read out over distances of the order of 10 m or more. A corresponding data memory has two logical memory parts, namely the inventory data, which are transmitted during the "first" read-out, also called INVENTORY, and the additional data (second, third section). The additional data are accessed directly during read-out (ACCESS). As already described, all data memories/tags are inventoried and reported to a control device in known methods. However, the objects with the data memories move through the reading zone, so that only a limited time is available for inventory and access. As a result, in known methods, not all data memories are read out if there are too many data memories in the reading zone that respond to the reading device.

The selector value is a command that is stored in each data memory, is first read by the reader and can then be sent by the latter before an "INVENTORY round" (the identification of a plurality of data memories/tags) in order to select a specific set of data memories that are identified by a code in the inventory data stored in the data memory. Only the selected data memories may respond during read-out. With RAIN® technology, the selector value is typically placed at the first position in the inventory data. The remaining inventory data are typically the identification data relating to the object (see above). The order in which the RAIN® RFID data memories react or are read out during the inventory cannot be controlled.

The selector value can have an option that instructs the data memory of the corresponding tag to transmit only the inventory data stored in the data memory after the selector value. Since the reading device already knows the selector value, these do not need to be read out again. This "truncate command" reduces the number of data transmitted from the data memory, allowing more time to read further data memories. The selector value and data stored in the data memory before the selector value are also not transmitted from the data memory to the reading device when using the "truncate command". These data are therefore not received by the reader, which can be problematic for the known reading-out of RAIN® data memories. The method described here makes use of this otherwise rather problematic selective reading-out of data. In fact, this cascade-like reading-out of a plurality of data memories and the selective acquisition of certain data can achieve a particularly high degree of efficiency and security when authenticating and/or validating the object.

The invention claimed is:

1. A method for authenticating and/or validating an identity of an object, and information about the object, wherein the identity and the information relating to the object are stored in at least two data memories of a respective tag and these data memories are read out contactlessly by a reading device, wherein the tags are fastened to the object and read out in arbitrary permutations, and wherein data sets with a plurality of data elements are stored in the data memories in a specified order, wherein the data elements comprise the identity or information relating to the object, the tag and/or a multiplicity of directly accessible authentication codes, wherein each data element is assigned to a permutation of the tags, thus providing a single directly accessible authentication code for authentication and/or validation.

2. The authentication and/or validation method as claimed in claim 1, wherein a data element that is identical for all data memories of the tags arranged on the same object is used to target data sets of associated data memories on the object for reading, wherein the data element of the first data memory read is used as the selector for the associated data memories of the tags on the object.

3. The authentication and/or validation method as claimed in claim 1, wherein, after the first data memory has been read out, the associated data memories only transmit data to the reading device which are stored at a memory address which is greater than the memory address of the data element.

4. The authentication and/or validation method as claimed in claim 1, wherein the permutation of a reading sequence of the data memories of the plurality of tags is mapped by the reading device to a directly accessible authentication code, when the code is stored in the last read data memory of the object.

5. The authentication and/or validation method as claimed in claim 1, wherein, after the data memory has been read out by the reading unit, this tag is muted so that the data memory of this tag is not read out again in the further method and no further signals are generated.

6. The authentication and/or validation method as claimed in claim 1, wherein each data memory is divided into three sections, namely a first section, a second section and a third section, wherein the following data elements can be stored in the sections:

First section: CRC, PC, identity of the tag issuer, a registration number, the object identifier, information about the position of the tag on the object, information about and number of further tags on the same object, a selector value, Second section: Identification of the data memory, and Third Section: User information, such as signatures of individual data memories, authentication codes, possible permutations of all tags.

7. The authentication and/or validation method as claimed in claim 1, wherein the following steps are carried out for authenticating and/or validating the object:

the reading unit first reads out the first, then the second and then the third section of the first data memory, the first tag with the first data memory is muted for the further method, so that the data memory is not read out again and also does not emit a signal, the position of the tag on the object, the number and position of further tags on the same object and the selector value are extracted from the first section of the first data memory, based on the selector value, the reading unit searches for the second tag, wherein only some of the data are read out from the first section of the second data memory and the second tag sends a signal that it has been detected, a part of the first section and the second and third sections of the second data memory are read out by the reading unit, the second tag with the second data memory is muted for the further method, so that the data memory is not read out again and also does not emit a signal, if further tags are arranged on the object, at least some of these steps can be repeated, and comparison of the read-out authentication codes of all data memories of the object with the permutations stored in the data memory last read out.

8. The authentication and/or validation method as claimed in claim 1, wherein if the data comparison of the at least two tags of the object has led to the authentication and/or validation of the object, a corresponding positive authentication/validation signal is generated and, if the comparison of the data has revealed that the tags cannot be assigned to the same object, a negative authentication/validation signal is generated.

9. The authentication and/or validation method as claimed in claim 1, wherein the authentication/validation is carried out during a movement of the object relative to the reading unit.

10. The authentication and/or validation method as claimed in claim 1, wherein RAIN® RFID technology is used to read out the data memories of the tags.

* * * * *